M. MOSKOWITZ.
ANTICHATTERING COUPLING OR CONNECTION.
APPLICATION FILED OCT. 22, 1921.
1,428,249.
Patented Sept. 5, 1922.
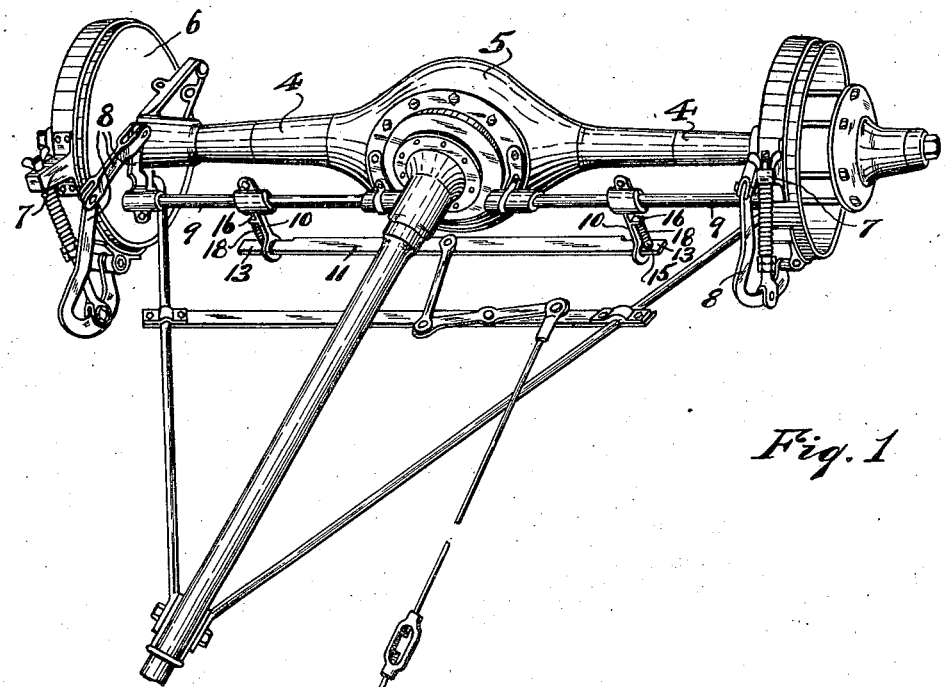
Fig. 1
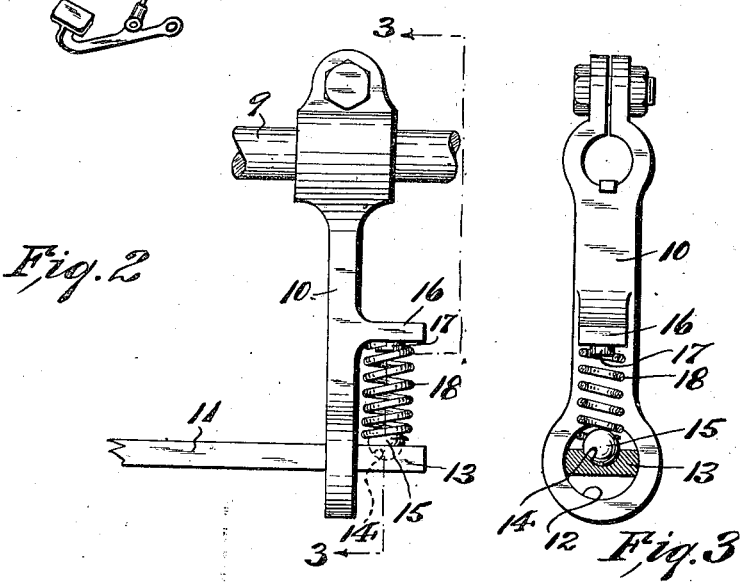
Fig. 2
Fig. 3
INVENTOR
Morris Moskowitz,
BY
Fraentzes and Richards
ATTORNEYS Patented Sept. 5, 1922.

1,428,249

UNITED STATES PATENT OFFICE.

MORRIS MOSKOWITZ, OF MONTCLAIR, NEW JERSEY.

ANTICHATTERING COUPLING OR CONNECTION.

Application filed October 22, 1921. Serial No. 509,664.

*To all whom it may concern:*

Be it known that I, MORRIS MOSKOWITZ, a citizen of the United States, residing at Montclair, in the county of Essex and State of New Jersey, have invented certain new and useful Improvements in Antichattering Couplings or Connections; and I do hereby declare the following to be a full, clear, and exact description of the invention, such as will enable others skilled in the art to which it appertains to make and use the same, reference being had to the accompanying drawings and to characters of reference marked thereon, which form a part of this specification.

This invention relates, generally, to improvements in anti-chattering couplings for use in various kinds of mechanisms where a noiseless pivotal or rotatable connection between two parts is desirable; and the invention has reference, more particularly, to a noiseless or anti-chattering coupling or connection especially adapted for pivotally connecting the ends of an equalizing bar with the actuating levers of a brake mechanism, such, for example, as that shown and described in my prior United States Letters Patent No. 1,390,373, September 13, 1921.

The invention has for its principal object to provide a simply constructed coupling for the general and special purposes above mentioned, in which a novel means is provided for maintaining the coupled parts in operative associated relation, free for mutual movement relative one to the other, and yet firmly held against chattering, rattling or the production of other noise consequent upon vibration or similar causes.

Other objects of this invention, not at this time more particularly enumerated, will be clearly understood from the following detailed description of the same.

With the objects of this invention in view, the same consists, primarily, in the novel anti-chattering coupling means hereinafter set forth; and, the invention consists, furthermore, in the novel arrangements and combinations of the various devices and parts, as well as in the details of the construction of said parts, all of which will be more fully described in the following specification, and then finally embodied in the claims appended thereto.

The invention is clearly illustrated in the accompanying drawings, in which:—

Figure 1 is a perspective view of an automobile brake mechanism, such as shown in my previous patent above referred to; the same illustrating the novel coupling means, embodying the principles of this invention, arranged to operatively connect the equalizing bar with the actuating levers of said brake mechanism.

Figure 2 is a detail side view showing one end of the equalizing bar as associated with an actuating lever, and provided with the novel anti-chattering coupling arrangement, and Figure 3 is a detail part section and part elevation of the said parts, taken on line 3—3 in said Figure 2; both Figures 2 and 3 are on an enlarged scale.

Similar characters of reference are employed in all of the hereinabove described views, to indicate corresponding parts.

For the purpose of rendering the principles of its structure and operation readily understood, I have chosen to describe the novel anti-chattering coupling embodying this invention as associated with an automobile brake mechanism and the equalizing devices therefor, since the same is especially desirable in such an arrangement, although it will be evident that the anti-chattering coupling may, per se, be employed in various other kinds of mechanisms where a noiseless pivotal or rotatable connection between two parts is a desideratum.

Referring, therefore, to the accompanying drawings, the reference character 4 indicates the rear axle housing of an automobile, the same having intermediate its ends a differential housing 5, and having at its respective ends the flanges 6 for supporting the rear wheel brake-mechanisms 7. Each brake mechanism is operated, through suitable intermediate lever mechanism 8, by a rockshaft 9 upon which is secured an actuating lever arm 10. The reference character 11 indicates a floating equalizer bar, the respective ends of which are operatively coupled with the respective actuating lever arms 10 by means of the novel anti-chattering coupling or connection, so that a push or pull upon said equalizing bar will swing said actuating lever arms 10 to rock the rockshafts 9 thereby setting or releasing the brake mechanism, as will be clearly evident.

The said novel anti-chattering coupling structure consists in providing the free end of each actuating lever arm with a circular eye or seat portion 12 into which is received an end 13 of said equalizer bar 11, in such a manner that the latter may swivel or turn in the former when said equalizer bar thrusts upon said actuating lever arms. To prevent chattering of the ends 13 of said equalizer bar in the seat portions 12 of the actuating lever arms, due to vibration or other causes, and which if not prevented would produce considerable noise, to say nothing of undue wear and tear as to the thus connected parts, I provide said ends of the equalizer bar with semi-spherical or countersunk socket 14 adapted to receive a spherical member or ball 15. Each actuating lever arm is provided, intermediate its ends, with a laterally projecting lug or abutment 16, which is so situated as to be opposed to and spaced away from said ball 15, when the latter is operatively related to its socket 14 in the end of the equalizer bar. Said lug or abutment 16 is provided with a retaining boss 17. Arranged between the opposed ball 15 and the said lug or abutment 16 is a compression spring 18, one end of the latter being retained against displacement from the lug or abutment by said retaining boss 17. Said compression spring, being fixed at one end against the stationary lug or abutment 16, while its opposite end engages said ball 15, exerts a thrust or pressure upon the ball, which is transmitted thereby to the end of the equalizer bar so that the end 13 of the latter is forced into and maintained in contact with the sides of the circular eye or seat portion 12, yet leaving the same free for swiveling action or turning when the actuating lever arms swing under the thrust or pressure of the equalizer bar. By thus maintaining the ends of the equalizer bar in constant contact with the eyes or seat portions of the actuating lever arms, all chattering and noise consequent thereupon is prevented, and a smoothly operating noiseless connection between the respective parts is adequately maintained.

I am aware that some changes may be made in the arrangements and combinations of the various devices and parts, as well as in the details of the construction of the same, without departing from the scope of my invention as set forth in the foregoing specification and as defined in the appended claims. Hence, I do not limit my invention to the exact arrangements and combinations of the various devices and parts as described in said specification, nor do I confine myself to the exact details of the construction of said parts as illustrated in the accompanying drawings.

I claim:—

1. The combination with a lever member having a circular seat portion, of a second member having an end projecting into and engaged with said seat portion, a lateral abutment on said lever member, and a compression spring engaged between said abutment and the seated end of said second member, substantially as and for the purposes described.

2. The combination with a lever member having a circular seat portion, of a second member having an end projecting into and engaged with said seat portion, the seated end of said second member having a socket, a ball seated in said socket, a lateral abutment on said lever member, and a compresion spring engaged between said abutment and said ball, substantially as and for the purposes described.

3. In an automobile braking system, the combination with the rear wheel brake mechanisms of a transverse equalizer bar, actuating lever arms connected with said brake mechanisms, said actuating lever arms having circular seats to receive the ends of said equalizer bar, and means holding the ends of said equalizer bar against chattering in said seats.

4. In an automobile braking system, the combination with the rear wheel brake mechanisms of a transverse equalizer bar, actuating lever arms connected with said brake mechanisms, said actuating lever arms having circular seats to receive the ends of said equalizer bar, laterally projecting abutments on said actuating lever arms, and compression springs mounted between the ends of said equalizer bar and said abutments to hold said bar against chattering in said seats.

5. In an automobile braking system, the combination with the rear wheel brake mechanisms of a transverse equalizer bar, actuating lever arms connected with said brake mechanisms, said actuating lever arms having circular seats to receive the ends of said equalizer bar, the ends of said equalizer bar having sockets, balls seated on said sockets, laterally projecting abutments on said actuating lever arms opposed to and spaced away from said balls, and compression springs mounted between said balls and said abutments to hold said bar against chattering in said seats.

6. In an automobile braking system, the combination with the rear wheel brake mechanisms of a transverse equalizer bar, actuating lever arms connected with said brake mechanisms, said actuating lever arms having circular seats to receive the ends of said equalizer bar, the ends of said equalizer bar having sockets, balls seated on said sockets, laterally projecting abutments on said actuating lever arms opposed to and spaced away from said balls, compression springs mounted between said balls and said abutments to hold said bar against chattering in said seats, and said abutments having retaining bosses adapted under the abutting ends of said springs to hold the same against displacement from said abutments.

In testimony, that I claim the invention set forth above I have hereunto set my hand this 19th day of October, 1921.

MORRIS MOSKOWITZ.

Witnesses:
GEORGE D. RICHARDS,
ADOLPH HANSEN.